United States Patent
Miller et al.

(10) Patent No.: US 11,817,988 B2
(45) Date of Patent: Nov. 14, 2023

(54) DEMODULATION OF FREQUENCY-HOPPING SPREAD SPECTRUM (FHSS) SIGNALS USING SEQUENTIAL ARTIFICIAL INTELLIGENCE/MACHINE LEARNING (AI/ML) MODELS

(71) Applicant: Raytheon Company, Waltham, MA (US)

(72) Inventors: Jacob M. Miller, State College, PA (US); Joshua A. Noble, Altoona, PA (US); Shawn T. Henderson, State College, PA (US)

(73) Assignee: Raytheon Company, Waltham, MA (US)

( * ) Notice: Subject to any disclaimer, the term of this patent is extended or adjusted under 35 U.S.C. 154(b) by 155 days.

(21) Appl. No.: 17/550,713

(22) Filed: Dec. 14, 2021

(65) Prior Publication Data
US 2023/0188400 A1    Jun. 15, 2023

(51) Int. Cl.
*H04L 27/26*    (2006.01)
*H04B 1/7156*    (2011.01)
*G06N 20/00*    (2019.01)

(52) U.S. Cl.
CPC ....... *H04L 27/2649* (2013.01); *H04B 1/7156* (2013.01); *G06N 20/00* (2019.01)

(58) Field of Classification Search
CPC ..... H04L 27/2649; H04B 1/7156; H04B 1/10; H04B 1/1027; H04B 1/109; H04B 1/12; H04B 1/06; H04B 1/69
See application file for complete search history.

(56) References Cited

U.S. PATENT DOCUMENTS

| 2,292,387 | A | 8/1942 | Markey et al. |
| 7,835,319 | B2 | 11/2010 | Sugar |
| 2018/0014217 | A1 | 1/2018 | Kleinbeck et al. |
| 2020/0005030 | A1* | 1/2020 | Lee .......................... G01S 13/04 |
| 2020/0382156 | A1* | 12/2020 | Lo ............................ H04B 7/00 |

(Continued)

FOREIGN PATENT DOCUMENTS

| CN | 109617845 A | 4/2019 |
| CN | 110113288 A | 8/2019 |

OTHER PUBLICATIONS

Wang et al., "Deep Learning for Signal Demodulation in Physical Layer Wireless Communications: Prototype Platform, Open Dataset, and Analytics," arXiv:1903.04297v1 [eess.SP], Mar. 2019, 8 pages.

(Continued)

*Primary Examiner* — Khanh C Tran (57) ABSTRACT

A method includes using a first trained artificial intelligence/machine learning (AI/ML) model to identify occupied frequency channels associated with one or more incoming signals during multiple time periods, where the one or more incoming signals include a frequency-hopping spread spectrum (FHSS) signal. The method also includes generating one or more baseband signals using portions of the one or more incoming signals associated with the occupied frequency channels. The method further includes using a second trained AI/ML model to recover data from the one or more baseband signals, where the recovered data represents at least a portion of data that is encoded in the FHSS signal.

20 Claims, 6 Drawing Sheets

(56) References Cited

U.S. PATENT DOCUMENTS

| | | | |
|---|---|---|---|
| 2021/0175986 A1* | 6/2021 | He | H04B 17/364 |
| 2021/0331312 A1* | 10/2021 | Kim | G06F 18/2431 |
| 2022/0141619 A1* | 5/2022 | Parikh | G06N 20/00 |
| | | | 455/456.1 |
| 2022/0269943 A1* | 8/2022 | Szatmary | G06N 5/04 |
| 2023/0037704 A1* | 2/2023 | Hirzallah | G01S 5/0278 |
| 2023/0129589 A1* | 4/2023 | Parikh | G06N 20/10 |
| | | | 342/451 |

OTHER PUBLICATIONS

Khalfi et al., "When Machine Learning Meets Compressive Sampling for Wideband Spectrum Sensing," IEEE, 2017, 6 pages.

O'Shea et al., "Learning Robust General Radio Signal Detection using Computer Vision Methods," IEEE, 2017, 4 pages.

Shevitski et al., "Digital Signal Processing Using Deep Neural Networks," arXiv:2109.10404 [eess.SP], Sep. 2021, 21 pages.

Ma et al., "Signal Demodulation with Machine Learning Methods for Physical Layer Visible Light Communications: Prototype Platform, Open Dataset and Algorithms," arXiv:1903.11385v1 [eess.SP], Mar. 2019, 10 pages.

Roy et al., "Detection of Rogue RF Transmitters using Generative Adversarial Nets," 2019 IEEE Wireless Communications and Networking Conference (WCNC), 2019, 7 pages.

Wei et al., "Blind Estimation of the PN Sequence of a DSSS Signal Using a Modified Online Unsupervised Learning Machine," MDPI Article, Sensors, 2019, 12 pages.

Davies, "Radio Frequency Machine Learning Systems (RFMLS)," Defense Advanced Research Projects Agency, May 2022, 2 pages.

"The Radio Frequency Spectrum + Machine Learning = A New Wave in Radio Technology," Defense Advanced Research Projects Agency, Aug. 2017, 4 pages.

Kozoil et al., "Interception of Frequency-hopped DPSK Signals Using Unsynchronized Detection and Pattern Recognition," ResearchGate, Oct. 2004, 8 pages.

Wang et al., "Compressive Sampling for Recognition of Frequency-Hopping Spread Spectrum Signals," 12th International Conference on Wireless Communications and Signal Processing, IEEE, 2020, 6 pages.

Liu et al., "An EM Algorithm for Blind Hop Timing Estimation of Multiple FH Signals Using an Array System With Bandwidth Mismatch," IEEE Transactions on Vehicular Technology, vol. 56, No. 5, Sep. 2007, 10 pages.

* cited by examiner

DEMODULATION OF FREQUENCY-HOPPING SPREAD SPECTRUM (FHSS) SIGNALS USING SEQUENTIAL ARTIFICIAL INTELLIGENCE/MACHINE LEARNING (AI/ML) MODELS

TECHNICAL FIELD

This disclosure relates generally to signal analysis systems. More specifically, this disclosure relates to the demodulation of frequency-hopping spread spectrum (FHSS) signals using sequential artificial intelligence/machine learning (AI/ML) models.

BACKGROUND

Signal intelligence (SIGINT) generally refers to intelligence-gathering operations that occur through the interception and processing of electromagnetic signals or other signals. Ideally, intercepted signals can be demodulated, and data can be recovered from the demodulated signals. The recovered data may then be used for any suitable purposes. Similar types of operations may occur in a number of other signal analysis applications.

SUMMARY

This disclosure relates to the demodulation of frequency-hopping spread spectrum (FHSS) signals using sequential artificial intelligence/machine learning (AI/ML) models.

In a first embodiment, a method includes using a first trained AI/ML model to identify occupied frequency channels associated with one or more incoming signals during multiple time periods, where the one or more incoming signals include an FHSS signal. The method also includes generating one or more baseband signals using portions of the one or more incoming signals associated with the occupied frequency channels. The method further includes using a second trained AI/ML model to recover data from the one or more baseband signals, where the recovered data represents at least a portion of data that is encoded in the FHSS signal.

In a second embodiment, an apparatus includes at least one processing device configured to use a first trained AI/ML model to identify occupied frequency channels associated with one or more incoming signals during multiple time periods, where the one or more incoming signals include an FHSS signal. The at least one processing device is also configured to generate one or more baseband signals using portions of the one or more incoming signals associated with the occupied frequency channels. The at least one processing device is further configured to use a second trained AI/ML model to recover data from the one or more baseband signals, where the recovered data represents at least a portion of data that is encoded in the FHSS signal.

In a third embodiment, a non-transitory computer readable medium contains instructions that when executed cause at least one processor to use a first trained AI/ML model to identify occupied frequency channels associated with one or more incoming signals during multiple time periods, where the one or more incoming signals include an FHSS signal. The medium also contains instructions that when executed cause the at least one processor to generate one or more baseband signals using portions of the one or more incoming signals associated with the occupied frequency channels. The medium further contains instructions that when executed cause the at least one processor to use a second trained AI/ML model to recover data from the one or more baseband signals, where the recovered data represents at least a portion of data that is encoded in the FHSS signal.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7B, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, signal intelligence (SIGINT) generally refers to intelligence-gathering operations that occur through the interception and processing of electromagnetic signals or other signals. Ideally, intercepted signals can be demodulated, and data can be recovered from the demodulated signals. The recovered data may then be used for any suitable purposes. Similar types of operations may occur in a number of other signal analysis applications.

Frequency-hopping spread spectrum (FHSS) communications refer to communications where radio frequency (RF) signals are transmitted while changing the carrier frequency used to generate the RF signals over time. In some cases, the carrier frequency can be changed among many distinct frequencies over a wide spectral band. When the pattern or code used by a transmitter to change its carrier frequency is also known by a receiver, the receiver is able to receive and recover the data sent by the transmitter using the different carrier frequencies. Among other things, FHSS was designed to help reduce eavesdropping by an adversary or other party, which can be achieved since FHSS signals are typically difficult to characterize due to their shifting carrier frequencies. Moreover, conventional digital signal processor (DSP)-based techniques may struggle to demodulate FHSS signals at a level suitable for consistent bit recovery.

This disclosure provides approaches for demodulating FHSS signals using sequential artificial intelligence/machine learning (AI/ML) models. As described in more detail below, a series of multiple trained AI/ML models can be used to sequentially perform different functions in order to demodulate and recover information from FHSS signals. For example, a first AI/ML model (also referred to as a "channel monitor" model) can process information associated with one or more incoming signals and identify whether each of multiple frequency channels within a spectrum is occupied during different time slices or other time periods. In other words, the first AI/ML model can be used to determine whether a transmitter is transmitting over different frequency channels during different defined time periods. As a particular example, the first AI/ML model may generate probabilities that frequency channels are occupied or empty during given time slices. In some cases, the first AI/ML model may be implemented using a shallow two-layer artificial neural network (ANN), where each layer has a size of 2(m+1) and where m represents the number of input PSD bins (such as 1,024). Also, in some cases, the first AI/ML model may receive power spectral density (PSD) vectors corresponding to the time slices as inputs. In addition, in some cases, the first AI/ML model can be trained to have a low loss and can be evaluated for robustness with respect to problems such as channel overlap.

After channel identification, the one or more incoming signals can be detuned based on which frequency channels are occupied, such as by performing sub-band detuning of only the occupied channels based on the occupied channels' center frequencies, in order to produce one or more baseband signals. A second AI/ML model (also referred to as a "demodulation" AI/ML model) can be used to extract symbols or other encoded data from the one or more baseband signals in order to help recover information from the incoming signal(s). This allows for recovery of the information encoded in a captured FHSS signal or other FHSS signal. In some cases, the second AI/ML model may be implemented using a shallow ANN supporting a size of 2(M+1), where M represents the number of available symbols. Also, in some cases, the second AI/ML model can be trained to have a low loss and can be evaluated for robustness with respect to problems such as noise.

In this way, these AI/ML-based approaches can be used to effectively identify FHSS signals even when the FHSS signals hop between a number of frequency channels over time. Moreover, these AI/ML-based approaches can be used to effectively demodulate the FHSS signals and recover symbols or other encoded data carried by the FHSS signals while providing consistent bit recovery. Further, this can be achieved without requiring pre-existing knowledge of the FHSS modulation techniques being used and without requiring pre-existing knowledge of the frequency-hopping patterns being used by transmitters of the FHSS signals. In addition, the AI/ML models can be trained to provide high performance even in cases involving issues like high signal overlap between frequency channels, and the use of shallow network designs in some embodiments can help to avoid pitfalls that are common in other applications like image processing.

Note that while these AI/ML-based approaches for FHSS demodulation are often described as being used for signal intelligence purposes, the AI/ML-based approaches may be used in any other suitable applications. For example, the AI/ML-based approaches for FHSS demodulation may be used to support cognitive radio communications. In general, the AI/ML-based approaches described in this patent document may be used in any suitable device or system to support the demodulation of FHSS signals.

Figure 1:
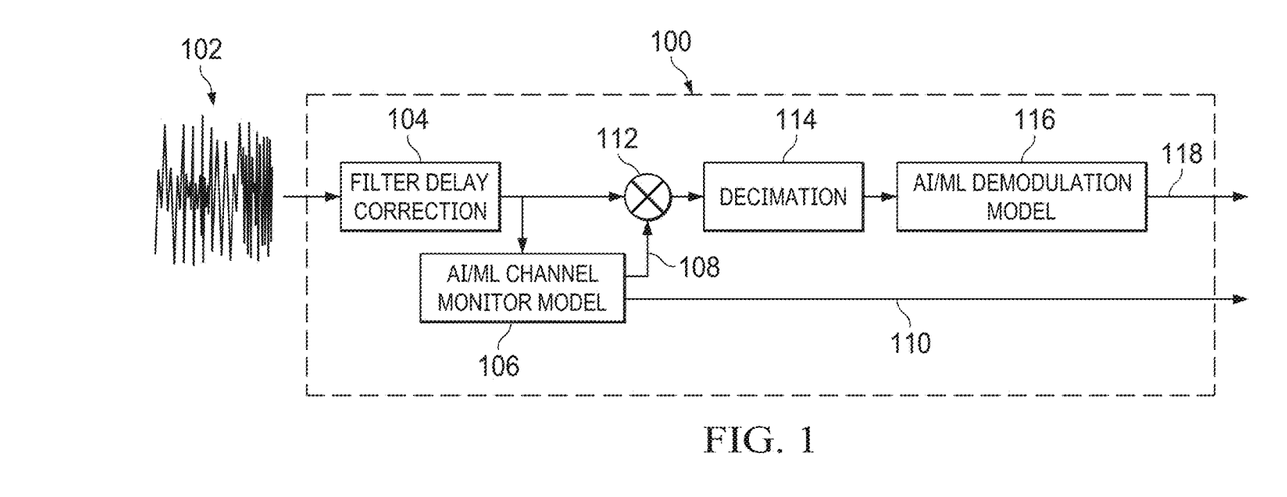
FIG. 1 illustrates an example architecture supporting demodulation of frequency-hopping spread spectrum (FHSS) signals using sequential artificial intelligence/machine learning (AI/ML) models according to this disclosure.

FIG. 1 illustrates an example architecture 100 supporting demodulation of FHSS signals using sequential AI/ML models according to this disclosure. As shown in FIG. 1, the architecture 100 receives and processes information defining or otherwise associated with one or more input signals 102. The one or more input signals 102 contain (among other things) an FHSS signal transmitted by a transmitter over multiple frequency channels to be demodulated by the architecture 100. The information associated with the one or more input signals 102 may be obtained from any suitable source, such as a receiver. The information associated with the one or more input signals 102 may also have any suitable form. In some cases, for instance, the information associated with the one or more input signals 102 may represent data defining a modulated frequency-hopped time-series signal. The time-series signal can span multiple time slices, and each time slice may represent a period of time in which the data defining the time-series signal can be analyzed.

In this example, the architecture 100 includes a filter delay correction function 104, which generally operates to at least partially correct for any delays introduced by filtering during reception of the one or more input signals 102. For example, a receiver that obtains the one or more input signals 102 may use a finite impulse response (FIR) filter or other type of filter to smooth or otherwise pre-process the received signal(s), which can introduce delays into the information associated with the one or more input signals 102. The filter delay correction function 104 can therefore operate to substantially or completely remove the delay associated with the filter in the time-series data associated with the one or more input signals 102. The filter delay correction function 104 may use any suitable technique to correct for delays caused by filtering of one or more signals. Note, however, that the use of the filter delay correction function 104 is optional since there may be some instances where filter delays are not significant or can be handled in other ways.

The information associated with the one or more input signals 102 is provided to an AI/ML channel monitor function 106, which includes or uses a first trained AI/ML model. The AI/ML channel monitor function 106 generally operates to process the information associated with the one or more input signals 102 in order to identify which frequency channels in a given spectrum are likely occupied, meaning a transmitter is transmitting one or more signals on that frequency channel. For example, the AI/ML channel monitor function 106 may use the first AI/ML model to process information and determine a likelihood or probability that each frequency channel is occupied during each time slice. This allows the AI/ML channel monitor function 106 to identify which frequency channels are likely occupied over time and how the usage of those frequency channels appears to change over time. In some embodiments, the information associated with the one or more input signals 102 includes or is used to generate power spectral density (PSD) measurements associated with the one or more input signals 102, where PSD measurements are associated with each of the time slices. In those embodiments, the first AI/ML model of the AI/ML channel monitor function 106 can process the PSD measurements in order to identify the probabilities or other indicators whether each of the frequency channels is occupied during the different time slices.

The AI/ML channel monitor function 106 includes or uses any suitable AI/ML model that has been trained to identify occupied frequency channels. In some embodiments, for example, the AI/ML channel monitor function 106 may include or use an AI/ML model implemented using a shallow two-layer artificial neural network (ANN), which receives and processes vectors of PSD measurements corresponding to the time slices. Each layer of the ANN may have a size of 2(m+1), where m represents the number of input PSD bins (such as 1,024). In the following discussion, the length of the vectors containing the PSD measurements that are provided as inputs to the AI/ML model of the AI/ML channel monitor function 106 can be denoted nFFT, and the total number of frequency channels may be denoted nchannels. In some cases, the outputs of the AI/ML channel monitor function 106 include a probability that each frequency channel is occupied for each time slice, where the probabilities for all frequency channels across a single time slice can sum to a value of one. Also, in some cases, the AI/ML channel monitor function 106 may include an AI/ML model having a linear regression layer (such as one having a size of nFFT×(2×nFFT+1)), a rectified linear unit (ReLU) activation layer, a dropout regularization layer (such as one having a probability of 0.6), another linear regression layer (such as one having a size of (2×nFFT+1)×(2×nFFT+1)), another ReLU activation layer, yet another linear regression layer (such as one having a size of (2×nFFT+1)×nchannels), and a sigmoid activation layer. Further, in some cases, the AI/ML model of the AI/ML channel monitor function 106 can be trained using a mean squared error (MSE) loss function, such as with the AdamW optimizer (which may have a learning rate of 0.00001 or other suitable value). Note, however, that any other suitable types of AI/ML models may be used here with the AI/ML channel monitor function 106.

Once the AI/ML model of the AI/ML channel monitor function 106 is suitably trained, the AI/ML channel monitor function 106 can be used to evaluate the information associated with the one or more input signals 102 in order to identify occupied frequency channels in different time slices. For example, the AI/ML channel monitor function 106 can process PSD measurements and generate a probability distribution for pre-defined frequency channels for each time slice. In some cases, the frequency channel with the highest probability may be determined to be occupied. In other cases, empty or unoccupied frequency channels may be identified based on the standard deviation across the probabilities, where a high standard deviation implies there is an occupied frequency channel and a low standard deviation implies that a frequency channel is empty. In particular embodiments, the threshold used with the standard deviation to differentiate between occupied and empty channels can be tuned for empty channel detection such that, when the standard deviation for a frequency channel is less than the threshold, the frequency channel is determined to be empty.

However the determination is made whether each frequency channel is occupied or empty, the AI/ML channel monitor function 106 can generate outputs 108 and 110. The outputs 108 can identify any occupied frequency channels, and the outputs 110 can identify any empty frequency channels. The outputs 108 are used as described below to further process the information associated with the one or more input signals 102 in the occupied frequency channel(s). The outputs 110 may be provided from the architecture 100 to any suitable destination(s) for storage or use. Each output 108, 110 may have any suitable form. For example, if a frequency channel appears to be occupied, the output 108 may identify a number or other identifier that identifies the frequency channel, or the output 108 may identify a center frequency of the frequency channel. If a channel appears to be unoccupied, the output 110 may identify a time signature corresponding to the empty channel.

The outputs 108 from the AI/ML channel monitor function 106 are provided to a baseband detuner 112, which processes the information associated with the one or more input signals 102 in order to detune an FHSS signal contained in the one or more input signals 102. For example, since the outputs 108 identify the frequency channels that are likely occupied, the baseband detuner 112 can use these channel predictions to perform sub-band detuning in order to detune the portions of the one or more input signals 102 that may be associated with a frequency-hopped signal. As a particular example, sub-band detuning can be used for each portion of the one or more input signals 102 within the time bounds of an occupied frequency channel. In some cases, the channel frequencies of the frequency channels are assumed to be known values, and the outputs 108 may identify or be used to identify the center frequencies of the occupied frequency channels. In other cases, the baseband detuner 112 or another component of the architecture 100 may perform carrier estimation and symbol rate estimation in order to estimate the center frequency for each occupied frequency channel and the symbol rate of each occupied frequency channel. The baseband detuner 112 may use any suitable technique to perform sub-band detuning, such as by performing a mixing function to down-convert portions of the one or more input signals 102 to baseband.

A decimation function 114 may be used to decimate the baseband signal or signals that are output from the baseband detuner 112. For example, the decimation function 114 may reduce the number of samples contained in each baseband signal for further processing. As a particular example, the decimation function 114 may reduce the number of samples contained in each baseband signal to one sample per symbol. However, this is for illustration only, and the decimation function 114 may reduce the number of samples in the baseband signal(s) in any other suitable manner. Note that the decimation function 114 is optional and can be excluded if decimation of the baseband signal(s) is not needed or required.

The decimated baseband signal or signals are provided to an AI/ML demodulation function 116, which includes or uses a second trained AI/ML model. The AI/ML demodulation function 116 generally operates to process the decimated baseband signal(s) and recover encoded data contained in the one or more input signals 102. The recovered data represents at least a portion of the data encoded in the one or more input signals 102. For example, the AI/ML demodulation function 116 may use the second AI/ML model to process the decimated baseband signal(s) and recover symbols representing the encoded data contained in the one or more input signals 102. This allows the AI/ML demodulation function 116 to recover information from an FHSS signal.

The AI/ML demodulation function 116 includes or uses any suitable AI/ML model that has been trained to identify symbols or other encoded data contained in one or more baseband signals. In some embodiments, for example, the AI/ML demodulation function 116 may include or use an AI/ML model implemented using a shallow ANN supporting a size of 2(M+1), where M represents a number of available symbols used to represent encoded data. In some cases, inputs to the AI/ML demodulation function 116 include I/Q values, which represent the real and imaginary components of the portions of the one or more input signals 102 as converted to baseband by the baseband detuner 112.

Also, in some cases, outputs of the AI/ML demodulation function 116 represent one-hot vectors of length M. Further, in some cases, the AI/ML demodulation function 116 may include a linear regression layer (such as one having a size of 2×5), a tanh activation layer, and another linear regression layer (such as one having a size of 5×M). In addition, in some cases, the AI/ML demodulation function 116 can be trained using an MSE loss function, such as with the AdamW optimizer. Note, however, that any other suitable types of AI/ML models may be used here with the AI/ML demodulation function 116.

Outputs 118 from the AI/ML demodulation function 116 represent data recovered from the one or more input signals 102. For example, the outputs 118 from the AI/ML demodulation function 116 may represent data bits that are recovered based on the identified symbols contained in the relevant portions of the one or more input signals 102. The recovered data may be provided to any suitable destination(s) for storage or use.

Note that the various functions 104-106, 112-116 shown in FIG. 1 and described above may be implemented in any suitable manner. For example, in some embodiments, the functions 104-106, 112-116 shown in FIG. 1 may be implemented or supported using one or more software applications or other software/firmware instructions that are executed by at least one processor or other processing device. In other embodiments, at least some of the functions 104-106, 112-116 shown in FIG. 1 can be implemented or supported using dedicated hardware components. In general, the functions 104-106, 112-116 shown in FIG. 1 and described above may be performed using any suitable hardware or any suitable combination of hardware and software/firmware instructions.

Although FIG. 1 illustrates one example of an architecture 100 supporting demodulation of FHSS signals using sequential AI/ML models, various changes may be made to FIG. 1. For example, various components in FIG. 1 may be combined, further subdivided, replicated, omitted, or rearranged and additional components may be added according to particular needs. Also, the various functions shown in FIG. 1 and described above may be implemented using a single device or multiple devices that may or may not be geographically distributed. In addition, while shown as outputting both the outputs 110 and the outputs 118, the outputs 110 need not be provided by the architecture 100 to any external destination(s).

Figure 2:
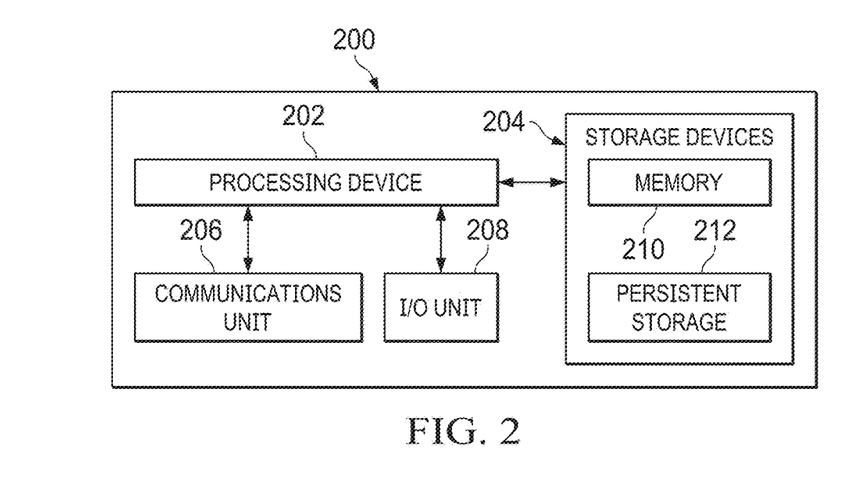
FIG. 2 illustrates an example device supporting demodulation of FHSS signals using sequential AI/ML models according to this disclosure.

FIG. 2 illustrates an example device 200 supporting demodulation of FHSS signals using sequential AI/ML models according to this disclosure. At least one instance of the device 200 may, for example, be used to implement at least a portion of the architecture 100 shown in FIG. 1 and described above. Note, however, that the architecture 100 may be implemented using any other suitable devices or systems. As a particular example, the architecture 100 may be implemented using multiple instances of the device 200, which may be positioned at or near the same general location or geographically distributed over a wide (and possibly very large) area.

As shown in FIG. 2, the device 200 may include at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc. In some embodiments, one or more of the storage devices 204 may be used to store information associated with the one or more input signals 102 and/or information generated by one or more of the various functions 104-106, 112-116 of the architecture 100.

The communications unit 206 supports communications with other systems or devices. For example, the communications unit 206 can include a network interface card or a wireless transceiver facilitating communications over a wired or wireless network. As particular examples, the communications unit 206 may be used to obtain information associated with one or more captured signals or other input signals 102 to be analyzed, or the communications unit 206 may be used to provide the outputs 110 and/or 118. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display or other suitable output device. Note, however, that the I/O unit 208 may be omitted if the device 200 does not require local I/O, such as when the device 200 represents a server or other device that can be accessed remotely.

In some embodiments, instructions are executed by the processing device 202 to implement the functionality of one or more functions shown in FIG. 1 and described above. For example, the instructions executed by the processing device 202 may cause the device 200 to obtain information associated with one or more input signals 102, generate PSD measurements associated with the input signal(s) 102 (if not already contained in the information associated with one or more input signals 102), and provide the PSD measurements to the AI/ML channel monitor function 106 for use in identifying frequency channels that are likely occupied. The instructions executed by the processing device 202 may also cause the device 200 to perform sub-band detuning to detune occupied frequency channels and to provide one or more baseband signals to the decimation function 114 for decimation or other sample reduction. The instructions executed by the processing device 202 may further cause the device 200 to provide the decimated baseband signal(s) to the AI/ML demodulation function 116 for use in recovering encoded data.

Although FIG. 2 illustrates one example of a device 200 supporting demodulation of FHSS signals using sequential AI/ML models, various changes may be made to FIG. 2. For example, computing and communication devices and systems come in a wide variety of configurations, and FIG. 2 does not limit this disclosure to any particular computing or communication device or system.

The following now describes specific example details related to the training of the AI/ML models used in the architecture 100. For example, the following describes example ways in which the AI/ML models of the AI/ML channel monitor function 106 and the AI/ML demodulation function 116 may be trained. Note, however, that these details are for illustration and explanation only and do not limit the architecture 100 or its AI/ML models to any specific training techniques.

As noted above, the AI/ML model of the AI/ML channel monitor function 106 can be trained to process information associated with one or more input signals 102 in order to identify which frequency channels in a given spectrum are likely occupied. To train the AI/ML model of the AI/ML channel monitor function 106, the AI/ML model can be provided with training data, such as vectors containing PSD measurements associated with signals having known frequency channels that are occupied and that are empty. Parameters of the AI/ML model can be adjusted until the AI/ML model accurately identifies occupied and empty frequency channels, at least to within an acceptable margin of loss. The training data that is used here may represent any suitable training data, such as simulated data or real-world data associated with signals having known frequency-hopping patterns (and therefore known occupied and empty channels). In some embodiments, the AI/ML model of the AI/ML channel monitor function 106 may be trained to recognize FHSS signals having different types of modulations. Example types of FHSS modulations that the AI/ML model of the AI/ML channel monitor function 106 can be trained to recognize may include binary phase shift keying (BPSK), on-off keying (OOF), frequency shift keying (FSK), or quadrature amplitude modulation (QAM).

Figure 3A:
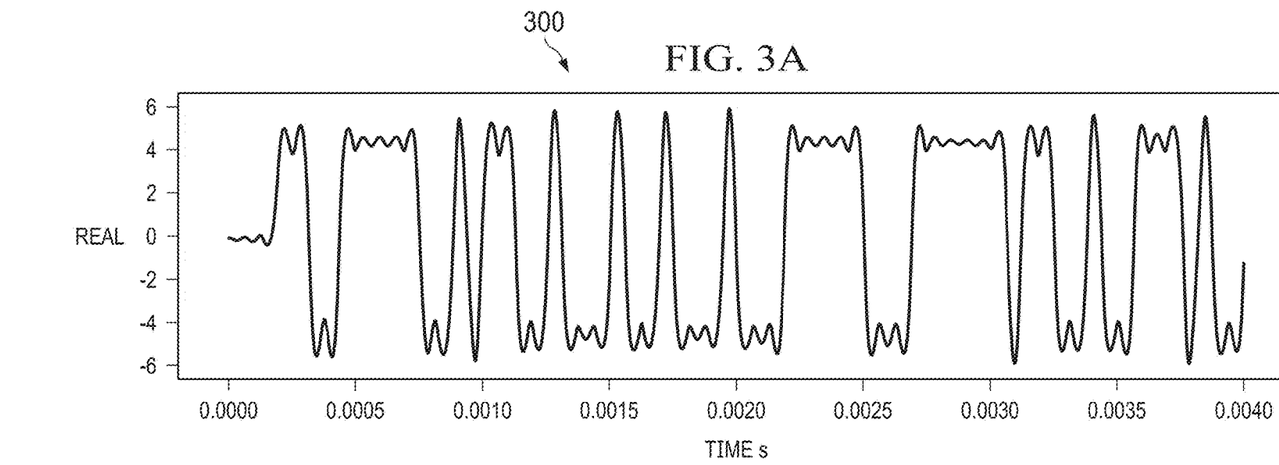
FIGS. 3A and 3B illustrate an example baseband signal that may be generated or otherwise obtained for training an AI/ML model used for channel monitoring according to this disclosure.
Figure 3B:
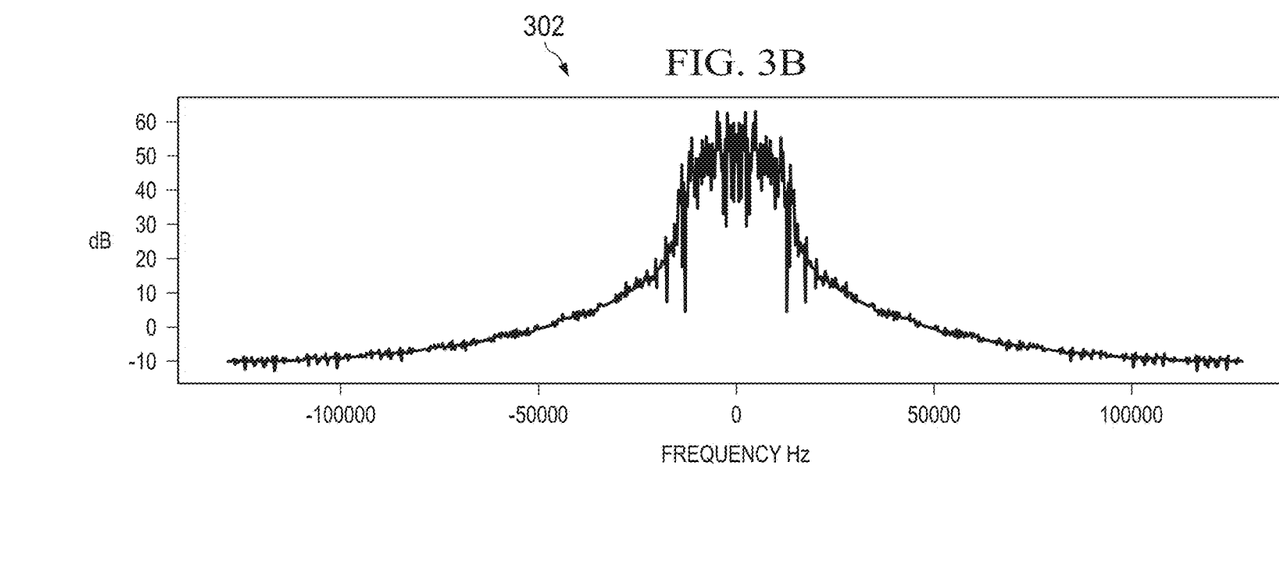

To generate simulated training data that may be used here, the following procedure can be performed. For each supported FHSS modulation technique (such as BPSK, OOF, FSK, and QAM), synthetic baseband signals can be generated, where the synthetic baseband signals may be based on a specified number of data points in each time slice, a specified sampling frequency, and a specified bandwidth. Setting the bandwidth of these signals permits the creation of FHSS spectrums with control over the channel widths and possible overlaps for later testing. Since the bandwidth can be fixed for the available modulations, the baud and samples per symbol can vary accordingly, and upsampling by an integer factor can be used to achieve the desired bandwidth and number of data points. For example, the symbols per sample (sps) may be determined as $$sps = \frac{2f_s}{\Delta f}$$

when generating synthetic baseband signals for BPSK, OOK, and QAM and as $$sps = \frac{4f_s}{\Delta f}$$

when generating synthetic BASEBAND signals for FSK. After upsampling, each signal can be low-pass filtered, such as by using a FIR filter to preserve its linear phase response. In some embodiments, the FIR filter may have a cut-off frequency of $$1.02 \frac{\Delta f}{2},$$

a stop-band attenuation of 30 dB, and a transition width of Cut-off/4. FIGS. 3A and 3B illustrate an example baseband signal that may be generated or otherwise obtained for training an AI/ML model used for channel monitoring according to this disclosure. More specifically, FIG. 3A contains an example graph 300 plotting the real component of a BPSK signal over time, where the BPSK signal represents a data sequence having bit values of [1 1 0 0 1 1 1 1 1 0 0 1 0 1 1 0 0 1 0 0], and FIG. 3B contains an example graph 302 plotting a frequency of the BPSK signal. This particular BPSK signal may have a bandwidth of about 25.6 kHz after filtering.

After generating a baseband signal, an FHSS signal can be constructed. For example, individual frequency channels can be created that have evenly-spaced carrier frequencies, where each frequency channel can span a frequency range $$f_{chan} = \frac{f_s}{nchan}$$

Figure 4:
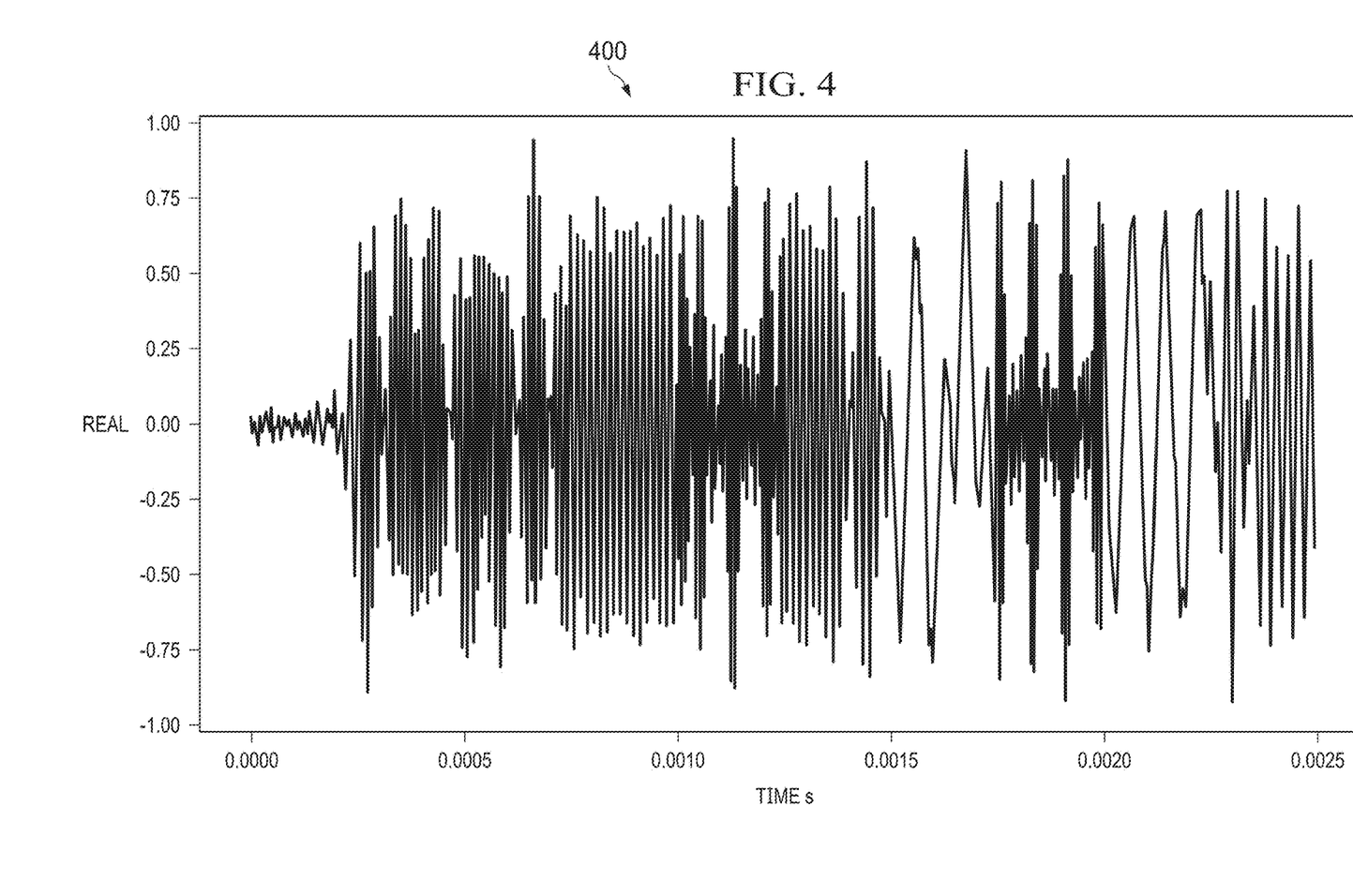
FIG. 4 illustrates an example FHSS signal that may be generated or otherwise obtained for training an AI/ML model used for channel monitoring according to this disclosure.

(where nchan represents the number of frequency channels). In general, any suitable technique may be used to generate known frequency channels here. For each time slice containing a specified number of bits (denoted nbits), the baseband signal is tuned to a particular channel's carrier frequency. A desired pattern of carrier frequencies can be used when hopping between the channels, and each channel can have a specified bandwidth and specified modulation or be empty. FIG. 4 illustrates an example FHSS signal that may be generated or otherwise obtained for training an AI/ML model used for channel monitoring according to this disclosure. More specifically, FIG. 4 contains an example graph 400 plotting the BPSK signal of FIGS. 3A and 3B. The BPSK signal here is tuned to different channel frequencies over time (note that the low signal at the start in FIG. 4 is due to the FIR filter delay).

Figure 5:
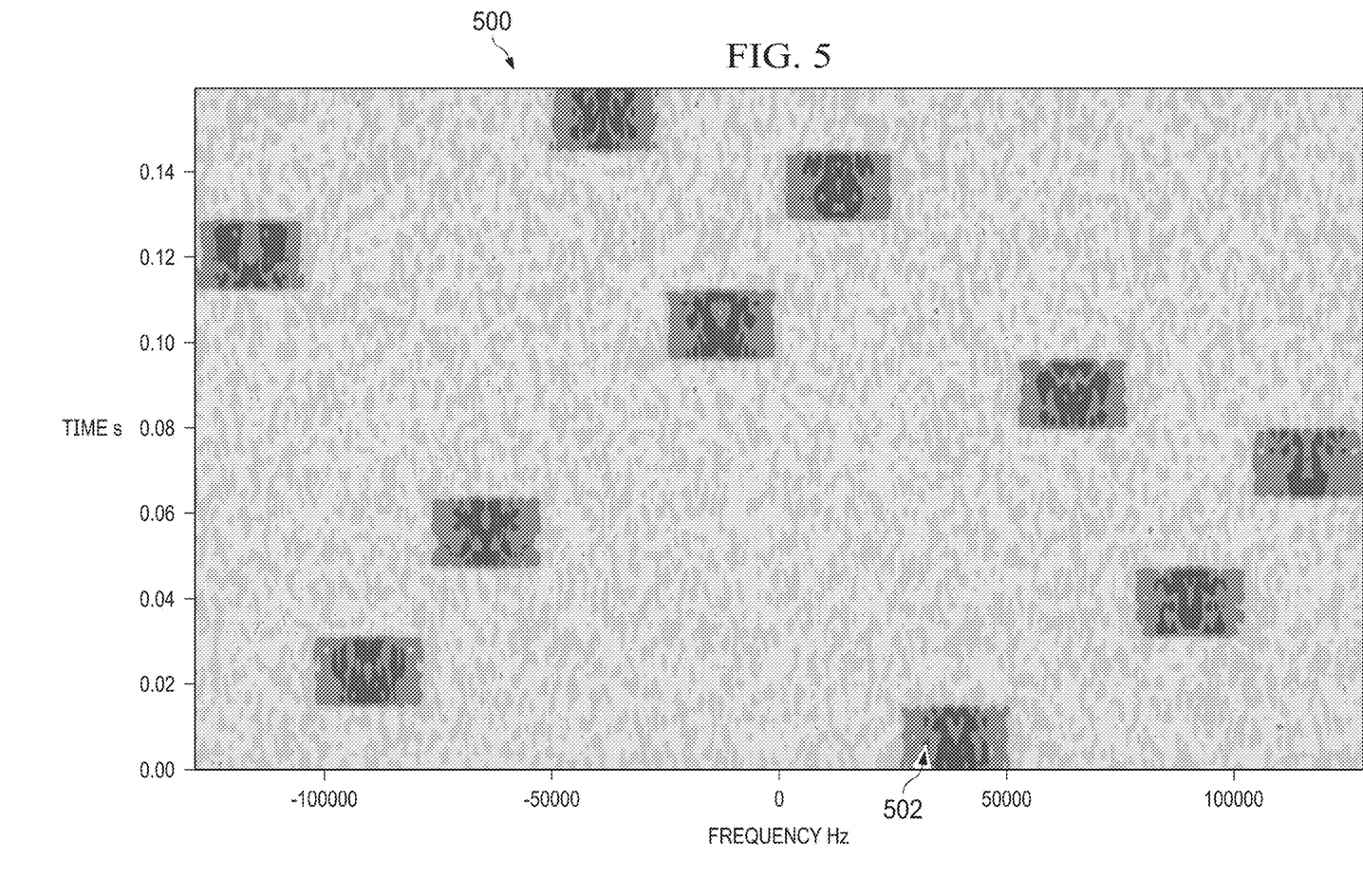
FIGS. 5 and 6 illustrate example spectrograms of FHSS signals that may be generated or otherwise obtained for training an AI/ML model used for channel monitoring according to this disclosure.
Figure 6:
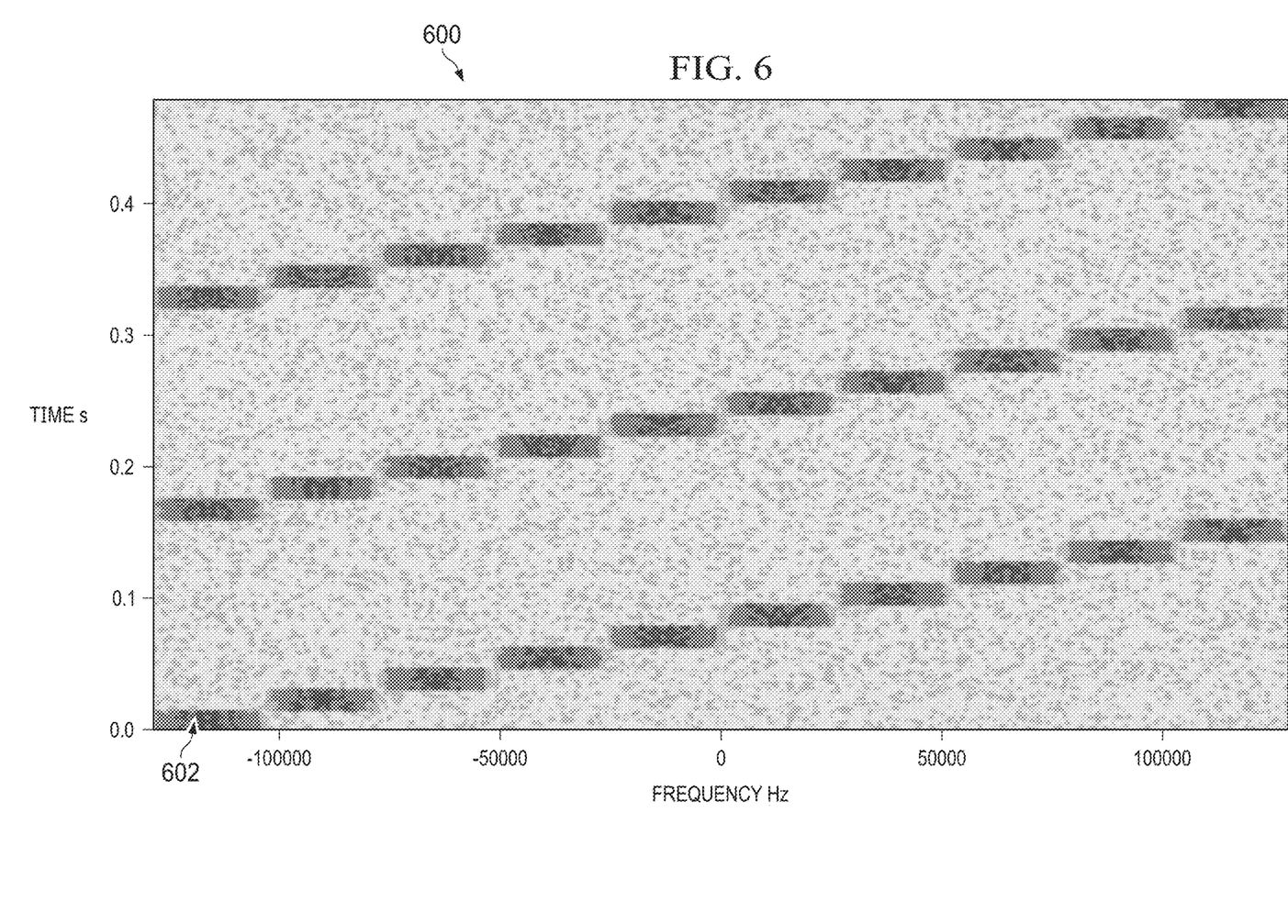

After an FHSS signal has been generated, a falling raster spectrogram can be created, where the spectrogram has a sampling frequency f and nFFT data points. FIGS. 5 and 6 illustrate example spectrograms 500 and 600 of FHSS signals that may be generated or otherwise obtained for training an AI/ML model used for channel monitoring according to this disclosure. In the example shown in FIG. 5, the spectrogram 500 is associated with a BPSK FHSS signal that is hopped to carrier frequencies corresponding to a channel sequence of [2, −4, 4, −3, 5, 3, −1, −5, 1, −2] or [7, 2, 9, 3, 10, 8, 5, 1, 6, 4], where the BPSK bandwidths are set to about 25.6 kHz in order to evenly divide a spectrum into ten channels. Regions 502 in the spectrogram 500 illustrate frequency channels that are occupied by the BPSK signal. Similarly, in the example shown in FIG. 6, the spectrogram 600 is associated with a BPSK FHSS signal that is hopped to carrier frequencies corresponding to a channel sequence of [−5, −4, −3, −2, −1, 1, 2, 3, 4, 5] or [1, 2, 3, 4, 5, 6, 7, 8, 9, 10], where the BPSK bandwidths are set to about 25.6 kHz in order to evenly divide a spectrum into ten channels. Regions 602 in the spectrogram 600 illustrate frequency channels that are occupied by the BPSK signal, and the frequency-hopping pattern is shown as repeating three times.

This type of training data can be used to train the AI/ML model of the AI/ML channel monitor function 106 since, as can be seen in FIGS. 5 and 6, the channels that are actually occupied can be identified. Thus, for example, the PSDs of different time slices can be used, along with an identification of the channels that are known to be occupied or empty during those time slices, to train the AI/ML model of the AI/ML channel monitor function 106 to recognize occupied and empty channels. As a particular example, numerous samples of PSD measurements can be labeled with known occupied and empty channels, and the samples and their labels can be used to train the AI/ML model of the AI/ML channel monitor function 106 over a number (and possibly a very large number) of training epochs. Ideally, the loss of the AI/ML model, which is based on the number of incorrect occupied or empty channel estimations, decreases over time and eventually reaches a suitably low level.

As a particular example of this training process, the AI/ML model of the AI/ML channel monitor function 106 can be trained as follows. Around ten thousand samples of signals with random modulations (such as BPSK, FSK, OOK, and QAM) at different signal-to-noise ratio (SNR) levels (such as 0, 6, 12, 18, and 24 dB) with or without channel overlap can be obtained and used to train the AI/ML model. Another ten thousand samples of signals with random modulations at different SNR levels with or without channel overlap can then be used to test the training of the AI/ML model, such as to verify that the AI/ML model as trained can suitably recognize occupied and empty frequency channels. If channel overlap is supported (meaning the frequency range of different channels can overlap one another), any suitable amount of channel overlap may be randomly used in the training samples.

Figure 7A:
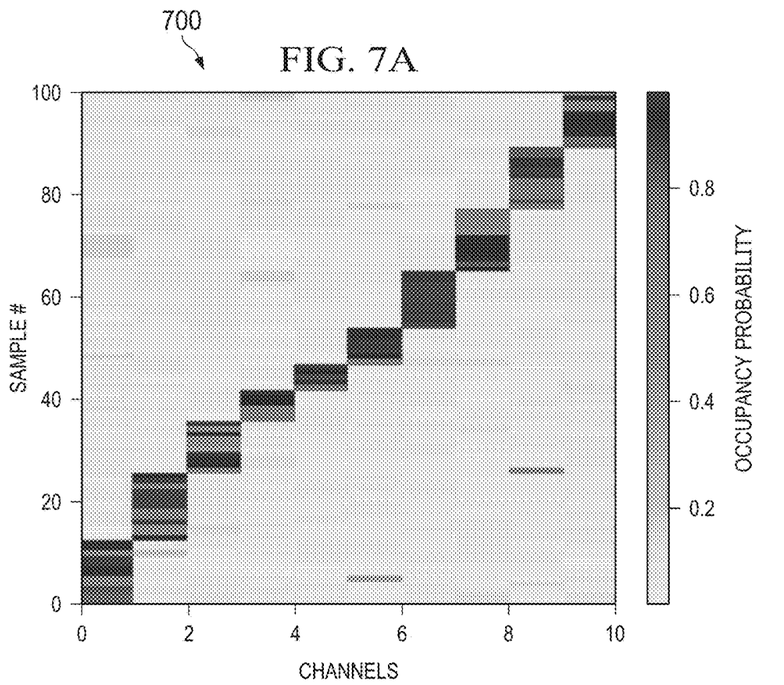
FIGS. 7A and 7B illustrate example results obtained from training an AI/ML model used for channel monitoring according to this disclosure.
Figure 7B:
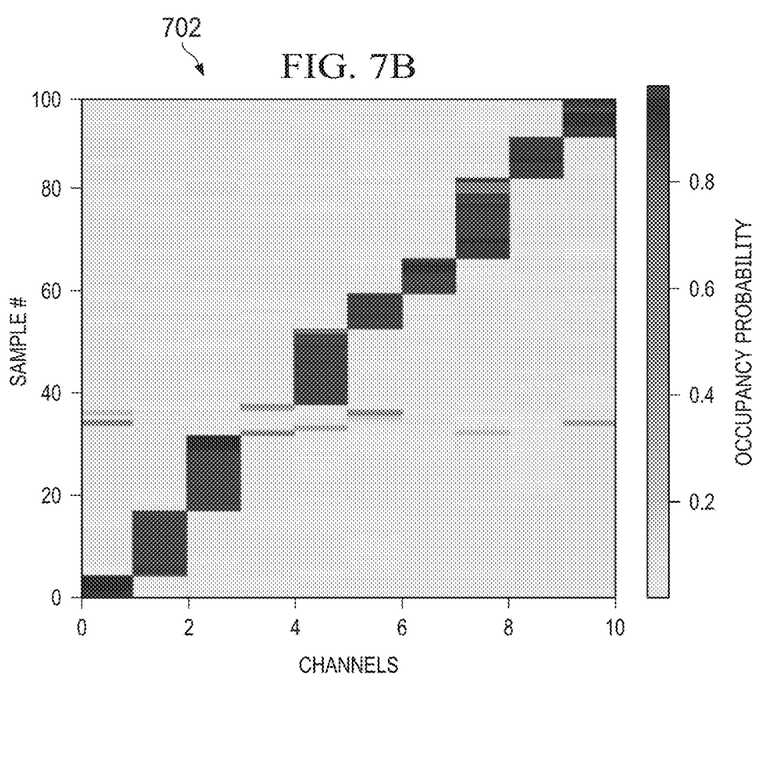

Once the AI/ML model of the AI/ML channel monitor function 106 is trained, the AI/ML model can be placed into use in order to estimate occupied and empty channels of additional signals. FIGS. 7A and 7B illustrate example results obtained from training an AI/ML model used for channel monitoring according to this disclosure. More specifically, FIG. 7A contains an example graph 700 illustrating channel occupancy probabilities that may be generated by the AI/ML model of the AI/ML channel monitor function 106, and FIG. 7B contains an example graph 702 illustrating channel occupancy probabilities after using their standard deviation to identify possibly empty channels. As can be seen here, the AI/ML model of the AI/ML channel monitor function 106 can identify different samples as being associated with different occupied and empty frequency channels, while the probabilities for "channel 3" have an excessively-high standard deviation so that this channel is identified as being empty.

To train the AI/ML model of the AI/ML demodulation function 116, the AI/ML model can be provided with training data, such as in the form of I/Q samples representing numerous known symbols. Parameters of the AI/ML model can be adjusted until the AI/ML model accurately identifies the symbols contained in the training data, at least to within an acceptable margin of loss. The training data that is used here may represent any suitable training data, such as simulated data or real-world data associated with signals encoding known symbols. As a particular example, one million I/Q samples with a suitable SNR level (such as about 10 dB) may be obtained for each modulation technique and used to train the AI/ML model of the AI/ML demodulation function 116. Note that while it may be assumed the frequency channels' center frequencies are known to support accurate sub-band detuning, some uncertainty may exist if the frequency channels' center frequencies are not known exactly or are estimated. The architecture 100 can operate with high effectiveness even with some channel frequency uncertainty, and various steps (such as performing channel monitoring evaluation on smaller time slices) may help to mitigate undesirable effects of this uncertainty. Note that the different AI/ML models used here can be trained separately (i.e. independently), which can help to ensure that the different AI/ML models are all able to perform their respective functions effectively and accurately.

Although FIGS. 3A through 7B illustrate examples of graphs related to training an AI/ML model used for channel monitoring, various changes may be made to FIGS. 3A through 7B. For example, these figures are merely meant to illustrate examples of signals and other information that may be generated, obtained, used, or produced during training or testing of the AI/ML model of the AI/ML channel monitor function 106. Any other or additional information may be used to train the AI/ML model of the AI/ML channel monitor function 106. Also, the specifics of the training techniques described above (such as the numbers of training samples and the types of training data) are for illustration only and can vary as needed or desired.

The following describes example embodiments of this disclosure that implement the demodulation of FHSS signals using sequential AI/ML models. However, other embodiments may be used in accordance with the teachings of this disclosure.

In a first embodiment, a method includes using a first trained AI/ML model to identify occupied frequency channels associated with one or more incoming signals during multiple time periods, where the one or more incoming signals include an FHSS signal. The method also includes generating one or more baseband signals using portions of the one or more incoming signals associated with the occupied frequency channels. The method further includes using a second trained AI/ML model to recover data from the one or more baseband signals, where the recovered data represents at least a portion of data that is encoded in the FHSS signal.

In a second embodiment, an apparatus includes at least one processing device configured to use a first trained AI/ML model to identify occupied frequency channels associated with one or more incoming signals during multiple time periods, where the one or more incoming signals include an FHSS signal. The at least one processing device is also configured to generate one or more baseband signals using portions of the one or more incoming signals associated with the occupied frequency channels. The at least one processing device is further configured to use a second trained AI/ML model to recover data from the one or more baseband signals, where the recovered data represents at least a portion of data that is encoded in the FHSS signal.

In a third embodiment, a non-transitory computer readable medium contains instructions that when executed cause at least one processor to use a first trained AI/ML model to identify occupied frequency channels associated with one or more incoming signals during multiple time periods, where the one or more incoming signals include an FHSS signal. The medium also contains instructions that when executed cause the at least one processor to generate one or more baseband signals using portions of the one or more incoming signals associated with the occupied frequency channels. The medium further contains instructions that when executed cause the at least one processor to use a second trained AI/ML model to recover data from the one or more baseband signals, where the recovered data represents at least a portion of data that is encoded in the FHSS signal.

Any single one or any suitable combination of the following features may be used with the first, second, or third embodiment. The first trained AI/ML model may use or may be configured to use PSD measurements associated with the one or more incoming signals to identify the occupied frequency channels during the time periods. The first trained AI/ML model may generate or may be configured to generate multiple probabilities for each time period, where each probability identifies a likelihood that one of the frequency channels is occupied during the associated time period. The one or more baseband signals may be generated by performing sub-band detuning based on the identified occupied frequency channels. The first and second trained AI/ML models may include artificial neural networks. The first trained AI/ML model may be trained to recognize the occupied frequency channels using samples of signals modulated using different FHSS modulation techniques and having known occupied or empty frequency channels, and the second trained AI/ML model may be trained to recover the data from the one or more baseband signals using I/Q samples of signals containing known symbols. The one or more baseband signals may be decimated, and the second trained AI/ML model may recover or be configured to recover the data from the one or more decimated baseband signals.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
using a first trained artificial intelligence/machine learning (AI/ML) model to identify occupied frequency channels associated with one or more incoming signals during multiple time periods, the one or more incoming signals including a frequency-hopping spread spectrum (FHSS) signal;
generating one or more baseband signals using portions of the one or more incoming signals associated with the occupied frequency channels; and
using a second trained AI/ML model to recover data from the one or more baseband signals, the recovered data representing at least a portion of data that is encoded in the FHSS signal.

2. The method of claim 1, wherein the first trained AI/ML model uses power spectral density (PSD) measurements associated with the one or more incoming signals to identify the occupied frequency channels during the time periods.

3. The method of claim 1, wherein the first trained AI/ML model generates multiple probabilities for each time period, each probability identifying a likelihood that one of the frequency channels is occupied during the associated time period.

4. The method of claim 1, wherein generating the one or more baseband signals comprises performing sub-band detuning based on the identified occupied frequency channels.

5. The method of claim 1, wherein the first and second trained AI/ML models comprise artificial neural networks.

6. The method of claim 1, wherein:
the first trained AI/ML model is trained to recognize the occupied frequency channels using samples of signals modulated using different FHSS modulation techniques and having known occupied or empty frequency channels; and
the second trained AI/ML model is trained to recover the data from the one or more baseband signals using I/Q samples of signals containing known symbols.

7. The method of claim 1, further comprising:
decimating the one or more baseband signals;
wherein the second trained AI/ML model recovers the data from the one or more decimated baseband signals.

8. An apparatus comprising:
at least one processing device configured to:
use a first trained artificial intelligence/machine learning (AI/ML) model to identify occupied frequency channels associated with one or more incoming signals during multiple time periods, the one or more incoming signals including a frequency-hopping spread spectrum (FHSS) signal;
generate one or more baseband signals using portions of the one or more incoming signals associated with the occupied frequency channels; and
use a second trained AI/ML model to recover data from the one or more baseband signals, the recovered data representing at least a portion of data that is encoded in the FHSS signal.

9. The apparatus of claim 8, wherein the first trained AI/ML model is configured to use power spectral density (PSD) measurements associated with the one or more incoming signals to identify the occupied frequency channels during the time periods.

10. The apparatus of claim 8, wherein the first trained AI/ML model is configured to generate multiple probabilities for each time period, each probability identifying a likelihood that one of the frequency channels is occupied during the associated time period.

11. The apparatus of claim 8, wherein, to generate the one or more baseband signals, the at least one processing device is configured to perform sub-band detuning based on the identified occupied frequency channels.

12. The apparatus of claim 8, wherein the first and second trained AI/ML models comprise artificial neural networks.

13. The apparatus of claim 8, wherein:
the first trained AI/ML model is trained to recognize the occupied frequency channels using samples of signals modulated using different FHSS modulation techniques and having known occupied or empty frequency channels; and
the second trained AI/ML model is trained to recover the data from the one or more baseband signals using I/Q samples of signals containing known symbols.

14. The apparatus of claim 8, wherein:
the at least one processing device is further configured to decimate the one or more baseband signals; and
the second trained AI/ML model is configured to recover the data from the one or more decimated baseband signals.

15. A non-transitory computer readable medium containing instructions that when executed cause at least one processor to:
use a first trained artificial intelligence/machine learning (AI/ML) model to identify occupied frequency channels associated with one or more incoming signals during multiple time periods, the one or more incoming signals including a frequency-hopping spread spectrum (FHSS) signal;
generate one or more baseband signals using portions of the one or more incoming signals associated with the occupied frequency channels; and
use a second trained AI/ML model to recover data from the one or more baseband signals, the recovered data representing at least a portion of data that is encoded in the FHSS signal.

16. The non-transitory computer readable medium of claim 15, wherein the first trained AI/ML model is configured to use power spectral density (PSD) measurements associated with the one or more incoming signals to identify the occupied frequency channels during the time periods.

17. The non-transitory computer readable medium of claim 15, wherein the first trained AI/ML model is configured to generate multiple probabilities for each time period, each probability identifying a likelihood that one of the frequency channels is occupied during the associated time period.

18. The non-transitory computer readable medium of claim 15, wherein the instructions that when executed cause the at least one processor to generate the one or more baseband signals comprise:
instructions that when executed cause the at least one processor to perform sub-band detuning based on the identified occupied frequency channels.

19. The non-transitory computer readable medium of claim 15, wherein the first and second trained AI/ML models comprise artificial neural networks.

20. The non-transitory computer readable medium of claim 15, wherein:
the first trained AI/ML model is trained to recognize the occupied frequency channels using samples of signals modulated using different FHSS modulation techniques and having known occupied or empty frequency channels; and
the second trained AI/ML model is trained to recover the data from the one or more baseband signals using I/Q samples of signals containing known symbols.

* * * * *